(12) United States Patent
Kawazoe et al.

(10) Patent No.: US 12,365,786 B2
(45) Date of Patent: Jul. 22, 2025

(54) SURFACE-TREATED NANOCELLULOSE MASTER BATCH

(71) Applicants: THE YOKOHAMA RUBBER CO., LTD., Tokyo (JP); SHINSHU UNIVERSITY, Matsumoto (JP)

(72) Inventors: Masayuki Kawazoe, Hiratsuka (JP); Tomoyuki Sakai, Hiratsuka (JP); Toru Noguchi, Nagano (JP)

(73) Assignees: THE YOKOHAMA RUBBER CO., LTD., Tokyo (JP); SHINSHU UNIVERSITY, Nagano (JP)

( * ) Notice: Subject to any disclaimer, the term of this patent is extended or adjusted under 35 U.S.C. 154(b) by 784 days.

(21) Appl. No.: 17/765,830

(22) PCT Filed: Oct. 8, 2020

(86) PCT No.: PCT/JP2020/038113
§ 371 (c)(1),
(2) Date: Mar. 31, 2022

(87) PCT Pub. No.: WO2021/070899
PCT Pub. Date: Apr. 15, 2021

(65) Prior Publication Data
US 2022/0363872 A1    Nov. 17, 2022

(30) Foreign Application Priority Data
Oct. 9, 2019  (JP) .................. 2019-186108

(51) Int. Cl.
*C08L 1/02* (2006.01)
*C08J 3/22* (2006.01)
*C08L 9/06* (2006.01)

(52) U.S. Cl.
CPC . *C08L 1/02* (2013.01); *C08J 3/22* (2013.01); *C08L 9/06* (2013.01); *C08J 2301/02* (2013.01); *C08J 2309/06* (2013.01); *C08L 2310/00* (2013.01)

(58) Field of Classification Search
None
See application file for complete search history.

(56) References Cited

U.S. PATENT DOCUMENTS

| | | | | |
|---|---|---|---|---|
| 2013/0190426 A1* | 7/2013 | Fujikura | .................. | C08L 1/00 524/9 |
| 2013/0303657 A1* | 11/2013 | Miyazaki | .................. | C08L 7/00 523/156 |
| 2018/0016433 A1* | 1/2018 | Doisneau | .................. | C08J 3/005 |
| 2018/0371182 A1* | 12/2018 | Ito | .............................. | C08J 3/22 |
| 2019/0119473 A1* | 4/2019 | Miyazaki | ............. | B60C 1/0016 |

FOREIGN PATENT DOCUMENTS

| | | | | |
|---|---|---|---|---|
| CN | 105419012 A | 3/2016 | | |
| CN | 107207833 A | 9/2017 | | |
| CN | 108299701 A | 7/2018 | | |
| CN | 108368277 A | 8/2018 | | |
| GB | 1367362 A | 9/1974 | | |
| JP | S58198546 A | 11/1983 | | |
| JP | H02022332 A | 1/1990 | | |
| JP | H02281054 A | 11/1990 | | |
| JP | 2002348411 A | 12/2002 | | |
| JP | 2011096393 A | * 5/2011 | ........... | C23C 14/042 |
| JP | 2013151586 A | 8/2013 | | |
| JP | 2013253222 A | 12/2013 | | |
| JP | 2014141637 A | 8/2014 | | |
| JP | 2014214300 A | 11/2014 | | |
| JP | 2016210822 A | 12/2016 | | |
| JP | 2017095611 A | 6/2017 | | |
| JP | 6353169 B2 | 7/2018 | | |
| JP | 2019123827 A | 7/2019 | | |
| WO | 2011096393 A1 | 8/2011 | | |

OTHER PUBLICATIONS

International Search Report issued Dec. 22, 2020 in corresponding International Application No. PCT/JP2020/038113, filed Oct. 8, 2020 (with English Translation).
"Fukui et al., ""Surface-hydrophobized TEMPO-nanocellulose/rubber composite films prepared in heterogeneous and homogeneous systems"", Cellulose 26, 463-473, Nov. 11, 2018Springer Science and Business Media LLC".

* cited by examiner

*Primary Examiner* — Peter A Salamon
(74) *Attorney, Agent, or Firm* — Global IP Counselors, LLP

(57) ABSTRACT

A surface-treated nanocellulose master batch includes a rubber component, a nanocellulose, a resole or novolac resorcin-formaldehyde initial condensation product, and formaldehyde. The the surface-treated nanocellulose master batch includes from 0.3 to 15 parts by mass of the nanocellulose per 100 parts by mass of the rubber component. The the surface-treated nanocellulose master batch includes from 0.03 to 1.2 parts by mass of the resole or novolac resorcin-formaldehyde initial condensation product per 1 part by mass of the nanocellulose and 0.02 to 0.8 parts by mass of the formaldehyde per 1 part by mass of the nanocellulose.

8 Claims, No Drawings

SURFACE-TREATED NANOCELLULOSE MASTER BATCH

CROSS-REFERENCE TO RELATED APPLICATION

This application is a U.S. National Stage application of International Application No. PCT/JP2020/038113, filed Oct. 8, 2020, which claims priority to Japanese Patent Application No. 2019-186108, filed Oct. 9, 2019, the contents of each of which are hereby incorporated by reference.

Field of the Invention

The present disclosure relates to a surface-treated nanocellulose master batch.

Background Information

A rubber composition constituting a tire or the like is required to have excellent characteristics such as excellent elastic modulus (elongation) and hardness. In order to improve such characteristics, a technology of blending a filler such as carbon black or silica into a rubber composition is known.

In addition, there is also a known technology (JP 6353169 B) of providing a rubber composition having excellent processability as well as excellent and well-balanced rigidity, fracture characteristic, and fuel efficiency by dispersing and including a chemically modified microfibril cellulose having a cationic group in a rubber composition.

SUMMARY

It has been determined that a nanocellulose such as a chemically modified microfibril cellulose has the property of easily aggregating and bundling in a process of moisture removal; thus, it may be difficult to maintain a state in which nanocellulose is disentangled at the nanometer-scale during the production of a master batch containing nanocellulose, and it may not be possible to obtain a rubber composition having the required characteristics from such a master batch. Therefore, there is room for further improvement in obtaining a surface-treated nanocellulose master batch in which nanocellulose is uniformly dispersed.

Accordingly, an object of the present disclosure is to provide a surface-treated nanocellulose master batch that can be used to yield a rubber composition having uniformly dispersed nanocellulose, excellent elongation, excellent hardness, excellent water resistance, and excellent resistance against breakage.

In order to solve the above problems, it was determined that a rubber component having uniformly dispersed nanocellulose, maintained elongation and hardness, excellent water resistance, and improved resistance against breakage can be formed from a surface-treated nanocellulose master batch containing a rubber component, a nanocellulose, a resole and/or novolac resorcin-formaldehyde initial condensation product, and formaldehyde, the surface-treated nanocellulose master batch including from 0.3 to 15 parts by mass of the nanocellulose per 100 parts by mass of the rubber component, and the surface-treated nanocellulose master batch including from 0.03 to 1.2 parts by mass of the resole and/or novolac resorcin-formaldehyde initial condensation product per 1 part by mass of the nanocellulose and the surface-treated nanocellulose master batch including from 0.02 to 0.8 parts by mass of the formaldehyde per 1 part by mass of the nanocellulose.

In other words, the present discloure provides the following aspects.

In a first aspect, a surface-treated nanocellulose master batch containing a rubber component, a nanocellulose, a resole and/or novolac resorcin-formaldehyde initial condensation product, and formaldehyde, the surface-treated nanocellulose master batch containing from 0.3 to 15 parts by mass of the nanocellulose per 100 parts by mass of the rubber component, and the surface-treated nanocellulose master batch containing from 0.03 to 1.2 parts by mass of the resole and/or novolac resorcin-formaldehyde initial condensation product per 1 part by mass of the nanocellulose and the surface-treated nanocellulose master batch containing from 0.02 to 0.8 parts by mass of the formaldehyde per 1 part by mass of the nanocellulose.

In a second aspect, the surface-treated nanocellulose master batch according to the second aspect, wherein the rubber component contains a diene rubber and a styrene-butadiene-vinylpyridine terpolymer.

In a third aspect, the surface-treated nanocellulose master batch according to the first aspect or the second aspect, further containing carbon black and/or silica.

In a fourth aspect, the surface-treated nanocellulose master batch according to any one of the first to third aspects, further containing from 0.1 to 15 parts by mass of an unsaturated fatty acid metal salt per 100 parts by mass of the rubber component.

In a fifth aspect, the surface-treated nanocellulose master batch according to the fourth aspect, wherein the unsaturated fatty acid metal salt is an acrylic acid metal salt and/or a methacrylic acid metal salt.

According to an embodiment of the present invention, it is possible to obtain a surface-treated nanocellulose master batch that yields a rubber component having uniformly dispersed nanocellulose, maintained elongation and hardness, excellent water resistance, and improved resistance against breakage.

DETAILED DESCRIPTION

Embodiments of the present invention will be described below.

An embodiment of the present invention is a surface-treated nanocellulose master batch containing a rubber component, a nanocellulose, a resole and/or novolac resorcin-formaldehyde initial condensation product, and formaldehyde, the surface-treated nanocellulose master batch containing from 0.3 to 15 parts by mass of the nanocellulose per 100 parts by mass of the rubber component, and the surface-treated nanocellulose master batch containing from 0.03 to 1.2 parts by mass of the resole and/or novolac resorcin-formaldehyde initial condensation product per 1 part by mass of the nanocellulose and the surface-treated nanocellulose master batch containing from 0.02 to 0.8 parts by mass of the formaldehyde per 1 part by mass of the nanocellulose. Hereinafter, the term "surface-treated nanocellulose master batch according to an embodiment of the present invention" will also be used.

First, the rubber component to be blended into the surface-treated nanocellulose master batch according to an embodiment of the present invention can be a rubber component generally used in the rubber industry such as a diene rubber or a butyl rubber. For the surface-treated nanocellulose master batch according to an embodiment of the present invention, a rubber latex, which is an aqueous dispersion in which the rubber component is colloidally dispersed in water, is preferably used as a raw material. In addition, the rubber component preferably contains a diene rubber and a styrene-butadiene-vinylpyridine terpolymer (VP) from the perspective of further increasing the dispersibility of the nanocellulose and the like described below.

Note that the diene rubber is a rubber component having a double bond in the polymer main chain, and examples thereof include a natural rubber (NR), a butadiene rubber (BR), a styrene-butadiene copolymer rubber (SBR), an acrylonitrile-butadiene copolymer rubber (NBR), a chloroprene rubber (CR), and an isoprene rubber (IR). In addition, the diene rubber preferably has a weight average molecular weight from 50000 to 3000000, more preferably from 100000 to 2000000.

In an embodiment of the present invention, the term "weight average molecular weight" refers to a value measured by gel permeation chromatography (GPC) using tetrahydrofuran as a solvent and calibrated with polystyrene.

Further, the surface-treated nanocellulose master batch according to an embodiment of the present invention is a master batch containing a nanocellulose that has been mechanically or chemically surface-treated (by, for example, mechanical defibration or chemical modification; an example is surface treatment by the action of the resole and/or novolac resorcin-formaldehyde initial condensation product described below, with surface treatment referring to disposing the condensation product in close proximity to at least a part of a surface); in an embodiment of the present invention, the term "nanocellulose", which refers to ultrafine fibers made of cellulose microfibrils and having an average fiber diameter from 1 to 1000 nm, includes cellulose nanofibers (CNFs) having an average fiber length from 0.5 to 5 μm and crystalline cellulose nanocrystals (CNCs) having an average fiber length from 0.1 to 0.5 μm. Note that, in an embodiment of the present invention, surface-treated nanocellulose can be simply referred to as "nanocellulose".

A cellulose serving as a raw material of the nanocellulose can be derived from wood or non-wood (bacteria, algae, cotton, etc.) and is not limited. Examples of the method of manufacturing the nanocellulose include: a method of adding water to a cellulose serving as a raw material, using a mixer or the like to process the mixture and prepare a slurry in which the cellulose is dispersed in water, and performing defibration by directly applying a mechanical shear force using a device such as a high-pressure device or an ultrasonic device; another example is a method of subjecting the slurry to a chemical treatment such as oxidation treatment, alkali treatment, or acid hydrolysis to modify the cellulose and facilitate defibration, and then performing defibration by applying a mechanical shear force using a disperser or the like. Subjecting cellulose to a chemical treatment and then defibration facilitates the cellulose to be defibrated more finely and uniformly with low energy, and easily yields a chemically modified nanocellulose. Note that examples of the chemical treatment include a treatment using a chemical treatment agent such as 2,2,6,6-tetramethylpiperidine-1-oxyl (hereinafter, referred to as "TEMPO"), 4-acetamido-TEMPO, 4-carboxy-TEMPO, 4-amino-TEMPO, 4-hydroxy-TEMPO, 4-phosphonooxy-TEMPO, phosphoric acid ester, periodic acid, an alkali metal hydroxide, and carbon disulfide. Alternatively, the chemical treatment can be performed after mechanically defibrating the cellulose. Furthermore, in addition to the chemical treatment described above, a treatment such as a cellulase treatment, carboxyniethylation, esterification, or a treatment with a cationic polymer can also be performed after the defibration to further enhance the affinity with the rubber component.

In an embodiment of the present invention, for further enhancing the affinity with the resole and/or novolac resorcin-formaldehyde initial condensation product described below, a nanocellulose having an anionogenic group (for example, one or more type(s) selected from the group consisting of a carboxy group, a phosphoric acid ester group, a phosphite ester group, a xanthate group, a suifone group, a sulfate group, and a thiolate group) is preferably used.

Note that the nanocellulose has an average fiber diameter from 1 to 1000 nm, preferably from 1 to 200 nm. In addition, an average aspect ratio (average fiber length/average fiber diameter) of the nanocellulose is preferably from 10 to 1000, more preferably from 50 to 500. In a case in which the average fiber diameter is less than the range above and/or the average aspect ratio exceeds the range above, the dispersibility of the nanocellulose can decrease. Further, in a case in which the average fiber diameter exceeds the range above and/or the average aspect ratio is less than the range above, the reinforcing performance of the nanocellulose can deteriorate.

In the present invention, the "average fiber diameter" and "average fiber length" of the nanocellulose are determined as follows. A nanocellulose aqueous dispersion having a solid content from 0.05 to 0.1 mass % is prepared, and, by TEM observation or SEM observation, an electron microscope image is captured under appropriate magnification setting depending on the size of the constituent fiber; an average value of the fiber diameters measured for 50 or more strands of fiber in this image is referred to as the "average fiber diameter", while an average value of the fiber lengths measured for 50 or more strands of fiber in this image is referred to as the "average fiber length". Further, an average aspect ratio is calculated using the average fiber length and the average fiber diameter obtained in this manner.

In addition, in an embodiment of the present invention, the nanocellulose is added in an amount from 0.3 to 15 parts by mass, preferably from 0.3 to 12 parts by mass, more preferably from 0.4 to 10 parts by mass, even more preferably from 0.4 to 8 parts by mass, and further preferably from 0.5 to 5 parts by mass per 100 parts by mass of the rubber component, resulting in the surface-treated nanocellulose master batch. In a case in which the nanocellulose is less than 0.3 parts by mass per 100 parts by mass of the rubber component, it may not be possible to sufficiently enhance the mechanical properties of the rubber composition obtained from the surface-treated nanocellulose master batch. Meanwhile, in a case in which the nanocellulose is more than 15 parts by mass per 100 parts by mass of the rubber component, the cost of the obtained surface-treated nanocellulose master batch may he high, and the nanocellulose may not be uniformly dispersed.

Note that, in an embodiment of the present invention, the nanocellulose can be mixed with a rubber latex or the like as an aqueous dispersion in which the nanocellulose is dispersed (with the solid content being approximately from 0.1 to 10 mass %), or the nanocellulose from which moisture has been removed can be mixed with a rubber latex or the like.

Further, the surface-treated nanocellulose master batch according to an embodiment of the present invention also contains, along with the nanocellulose, a resole and/or novolac resorcin-formaldehyde initial condensation product and formaldehyde.

In an embodiment of the present invention, the term "resorcin-formaldehyde initial condensation product (RF resin)" refers to a condensation product (oligomer) obtained by condensation reaction of resorcin, which is a phenolic resin, with formaldehyde under a catalyst; a degree of polymerization of the condensation product is preferably from 5 to 15. Also, the resorcin-formaldehyde initial condensation product can include unreacted resorcin and/or formaldehyde.

Note that a condensation product having a methylol group obtained by condensation reaction of resorcin with formaldehyde at a resorcin/formaldehyde molar ratio from 1/1 to 3 under an alkaline catalyst such as sodium hydroxide or sodium carbonate is a resole resorcin-formaldehyde initial condensation product [a condensation product represented by Chemical Formula (1) in Chemical Formula 1 below, where n represents the degree of polymerization], while a condensation product without a methylol group obtained by condensation reaction of resorcin with formaldehyde at a resorcin/formaldehyde molar ratio from 1/0.8 to 0.9 under an acid catalyst such as oxalic acid is a novolac resorcin-formaldehyde initial condensation product [a condensation product represented by Chemical Formula (2) in Chemical Formula 2 below, where in represents the degree of polymerization]. In the surface-treated nanocellulose master batch according to an embodiment of the present invention, the resorcin-formaldehyde initial condensation product can be either resole or novolac, but examples of a preferred aspect include a novolac resorcin-formaldehyde initial condensation product.

Chemical Formula 1

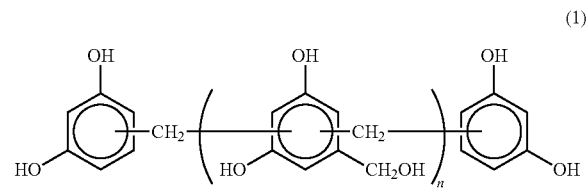

(1)

Chemical Formula 2

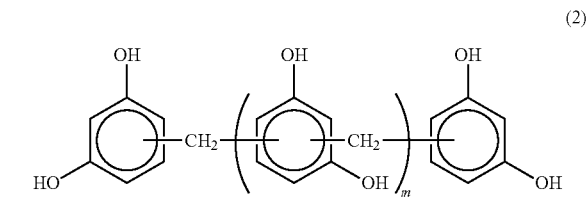

(2)

In addition, in an embodiment of the present invention, the amount of the resole and/or novolac resorcin-formaldehyde initial condensation product and the amount of formaldehyde are adjusted, and the surface-treated nanocellulose master batch contains the resole and/or novolac resorcin-formaldehyde initial condensation product from 0.03 to 1.2 parts by mass, preferably from 0.05 to 0.8 parts by mass, more preferably from 0.06 to 0.6 parts by mass, and even more preferably from 0.08 to 0.4 parts by mass, per 1 part by mass of the nanocellulose, and the formaldehyde from 0.02 to 0.8 parts by mass, preferably from 0.03 to 0.5 parts by mass, more preferably from 0.04 to 0.4 parts by mass, and even more preferably from 0.05 to 0.3 parts by mass, per 1 part by mass of the nanocellulose. In a case in which the resorcin-formaldehyde initial condensation product contains unreacted formaldehyde, a content of the unreacted formaldehyde is also included in the formaldehyde content of the surface-treated nanocellulose master batch according to an embodiment of the present invention. In a case in which these contents are less than the ranges above, it may not be possible to uniformly disperse the nanocellulose, and it may not be possible to sufficiently enhance the mechanical properties of the rubber composition obtained from the surface-treated nanocellulose master batch. Further, in a case in which these contents exceed the ranges above, the resistance against breakage and elongation of the rubber composition obtained from the surface-treated nanocellulose master batch can be reduced instead.

Furthermore, the surface-treated nanocellulose master hatch according to an embodiment of the present invention can further include a filler. Examples of the filler include carbon black, silica, clay, aluminum hydroxide, calcium carbonate, mica, talc, aluminum hydroxide, aluminum oxide, titanium oxide, barium sulfate, and lecithin. These fillers can be blended alone or two or more in combination; in particular, blending of carbon black and/or silica (such as fumed silica, calcined silica, precipitated silica, pulverized silica, molten silica, and colloidal silica) is highly preferred from the perspective of improving the strength and hardness of the rubber composition obtained from the surface-treated nanocellulose master batch according to an embodiment of the present invention and dispersing the nanocellulose more uniformly. A content of the filler in the surface-treated nanocellulose master batch according to an embodiment of the present invention is preferably 10 parts by mass or greater, more preferably from 20 to 100 parts by mass, even more preferably from 30 to 80 parts by mass, and further preferably from 40 to 70 parts by mass, per 100 parts by mass of the rubber component.

Note that, in an embodiment of the present invention, the term "carbon black" refers to carbon microparticles having a diameter of approximately from 3 to 500 nm manufactured under industrial quality control, and the term "silica" refers to silicon dioxide or a substance composed of silicon dioxide ($SiO_2$).

Here, an example of the method of manufacturing the surface-treated nanocellulose master batch according to an embodiment of the present invention will be described. First, from 0.3 to 15 parts by mass of the nanocellulose per 100 parts by mass of the rubber component (solid content of the rubber latex), from 0.03 to 1.2 parts by mass of the resole and/or novolac resorcin-formaldehyde initial condensation product per 1 part by mass of the nanocellulose, and from 0.02 to 0.8 parts by mass of formaldehyde per 1 part by mass of the nanocellulose are dispersed in a rubber latex, and a filler or the like is further blended as necessary, resulting in a raw material dispersion in a slurry state having a solid content concentration of 60 mass % or less. The dispersion method is not limited, and for example, a mechanical method can be performed. Furthermore, the nanocellulose is preferably mixed with the rubber latex as an aqueous dispersion, and the concentration of the aqueous dispersion is preferably from 0.1 to 10 mass %, more preferably from 0.1 to 5 mass %. By setting the concentration of the nanocellulose aqueous dispersion within such a range, a defibrated nanocellulose can be dispersed more uniformly in the aqueous dispersion. In addition, the formaldehyde is also preferably mixed with the rubber latex as an aqueous solution (formalin).

Note that the solid content concentration of the raw material dispersion is preferably 60 mass % or less, more preferably from 2 to 50 mass %, and even more preferably from 5 to 50 mass %, in a case in which the solid content concentration exceeds 60 mass %, there is a possibility that the viscosity of the raw material dispersion increases while the stability decreases.

Next, a coagulant is added to the raw material dispersion to aggregate and coagulate the polymer component, and moisture is removed by filtration or the like; then, the coagulation product is washed as necessary to remove the coagulant, and drying is performed as necessary, resulting in the surface-treated nanocellulose master batch according to an embodiment of the present invention.

Here, an inorganic salt (such as sodium chloride and potassium chloride) or an unsaturated fatty acid metal salt (such as an acrylic acid metal salt or a methacrylic acid metal salt) can be used as the coagulant.

In particular, the coagulant is more preferably an unsaturated fatty acid metal salt in that even if the unsaturated fatty acid metal salt is contained in the obtained surface-treated nanocellulose master batch, the properties such as hardness and elongation of the rubber composition obtained from the surface-treated nanocellulose master batch do not deteriorate, and thus the step of washing the coagulation product after aggregation and coagulation of the raw material dispersion can be omitted. The unsaturated fatty acid metal salt is highly preferably an acrylic acid metal salt and/a methacrylic acid metal salt. Moreover, examples of a preferred metal of the metal salt include sodium, potassium, calcium, magnesium, aluminum, zinc, and neodymium, Furthermore, in a case in which an unsaturated fatty acid metal salt is used as the coagulant, the unsaturated fatty acid metal salt is preferably contained in an amount from 0.1 to 15 parts by mass, more preferably from 0.2 to 10 parts by mass, even more preferably from 0.2 to 5 parts by mass, and further preferably from 0.2 to 2 parts by mass, and even further preferably from 0.3 to 2 parts by mass, per 100 parts by mass of the rubber component; it is suitable that the coagulant is contained within such a range because the properties of the resulting rubber composition are not affected while the aggregation and coagulation effect of the polymer component is sufficiently exhibited.

Moreover, various additives commonly used in rubber compositions can be mixed, in an appropriate amount, with the surface-treated nanocellulose master batch according to an embodiment of the present invention and kneaded using a known method to produce a rubber composition; examples of the additives include a filler, a silane coupling agent, zinc oxide, stearic acid, an adhesive resin, a pressure-sensitive adhesive, a peptizing agent, an anti-aging agent, a wax, a processing aid, an aroma oil, a liquid polymer, a terpene resin, a thermosetting resin, a vulcanizing agent (such as sulfur), a vulcanization accelerator, and a crosslinking agent. Note that additives other than vulcanizing agents, vulcanization accelerators, and cross-linking agents can be added to and blended with the raw material dispersion at the time of preparation of the surface-treated nanocellulose master batch according to an embodiment of the present invention.

The rubber composition resulted from the surface-treated nanocellulose master batch according to an embodiment of the present invention as described above has uniformly dispersed nanocellulose, maintained elongation and hardness, excellent water resistance, and improved resistance against breakage.

Examples of the present invention will be described below; the present invention is not limited to the following examples, and various modifications can be made within the technical concept of the present invention.

EXAMPLES

Test Example 1

Master batches were produced using the raw materials presented in Table 1 below.

Specifically, serving as the solid content, a rubber latex composed of styrene-butadiene copolymer rubber latex (SBR; Nipol LX112, available from ZEON CORPORATION) and styrene-butadiene-vinylpyridine terpolymer latex (VP; Nipol LX2518FS, available from ZEON CORPORATION), the rubber latex having a solid content, meaning dry rubber content, of 40.5 mass % and a ratio of SBR to VP of 95:5, an aqueous dispersion (having a solid content of 1.0 mass %) of oxidized nanocellulose (Cellenpia, available from Nippon Paper Industries Co., Ltd.), a novolac resorcin-formaldehyde initial condensation product (RF resin under the trade name of Sumikanol 700S, available from Sumitomo Chemical Co., Ltd.), and a formaldehyde aqueous solution (37% solution, available from Kanto Chemical Co., Ltd.) were mixed and dispersed at the mass ratios presented in Table 1 below, resulting in raw material dispersions (Examples 1 to 2 and Comparative Examples 2 to 3) in a slurry state having a solid content concentration of 60 mass % or less. Note that, in Comparative Example 1, the rubber latex, the nanocellulose, and dodecyltrimethylammonium chloride (available from Tokyo Chemical Industry Co., Ltd.) which acts as a surfactant served as the solid content and were mixed and dispersed at the mass ratio presented in Table 1 below, also resulting in a raw material dispersion in a slurry state. Additionally, in Comparative Example 4, the rubber latex and carbon black (under the trade name of SEAST, available from KH Tokai Carbon Co., Ltd.) served as the solid content and were mixed and dispersed at the mass ratio presented in Table 1 below, also resulting in a raw material dispersion in a slurry state.

TABLE 1

|  | Comparative Example 1 | Comparative Example 2 | Example 1 | Example 2 | Comparative Example 3 | Comparative Example 4 |
|---|---|---|---|---|---|---|
| Rubber latex (SBR + VP solid content) | 100 | 100 | 100 | 100 | 100 | 100 |
| CNF | 5 | 0.1 | 5 | 0.5 | 20 | — |
| Carbon black | — | — | — | — | — | 20 |
| RF resin | — | 0.01 | 0.5 | 0.05 | 2 | — |
| Formaldehyde | — | 0.01 | 0.5 | 0.05 | 2 | — |
| Surfactant | 3 | — | — | — | — | — |

Then, the raw material dispersions of Examples 1 to 2 and Comparative Examples 1 to 4 were subjected to coagulation by salting out using sodium chloride as a coagulant, and the coagulation products were collected, washed, and dried, resulting in master batches. Note that, for washing, the operation of filtering the coagulation products under reduced pressure with a Buchner funnel while spraying distilled water on the surface of the coagulation products to wash away the sodium chloride was repeated 5 times. Further, the drying was carried out by spreading the washed coagulation products in pans and placing the pans in a constant temperature dryer at 70° C. for 24 hours. To each of the obtained master batches, zinc oxide (ZnO, available from Seido Chemical Industry Co., Ltd.), stearic acid (available from NOF Corporation), a vulcanization accelerator (NOC-CELER-NS-P, available from Ouchi Shinko Chemical Industrial Co., Ltd.), and sulfur (MUCRON OT-20, available from Shikoku Chemicals Corporation) were added, and the mixture was kneaded using an open roll; then, the mixture was placed in a 15 cm×15 cm×0.2 cm mold and subjected to press vulcanization at 160° C. for 15 minutes, resulting in a vulcanized rubber test piece. Next, a tensile test was performed on the obtained vulcanized rubber test pieces in accordance with JIS K6251:2010, at a tensile speed of 500 mm/min, to measure the tensile stress at 100% elongation (M100:MPa) and the elongation at break (meaning elongation at the time of breaking:Eb) at room temperature (20° C.). Further, a breakage test was performed on the obtained vulcanized rubber test pieces in accordance with JIS K6252:2015, at a tensile speed of 500 mm/min, to measure the stress at break (MPa) at break at room temperature (20° C.). Moreover, an immersion test using water as the test liquid was performed on the obtained vulcanized rubber test pieces in accordance with JIS K6258:2016 to evaluate the water resistance.

The results are shown in Table 2 below. Note that M100, Eb and the stress at break are expressed as relative values (index values, index %) with Comparative Example 1 being assigned the value of 100.

These results show that the surface-treated nanocellulose master batch according to an embodiment of the present invention, which contained an oxidized nanocellulose, a novolac resorcin-formaldehyde initial condensation product, and formaldehyde at the predetermined amounts, was able to yield a rubber composition that provided elongation and hardness in a compatible manner while having good resistance against breakage (strength at breakage) and water resistance.

Test Example 2

Master batches were produced using the raw materials presented in Table 3 below.

Specifically, serving as the solid content, a rubber latex composed of styrene-butadiene copolymer rubber latex (SBR; Nipol LX112, available from ZEON CORPORATION) and styrene-butadiene-vinylpyridine terpolymer latex (VP; Nipol LX2518FS, available from ZEON CORPORATION), the rubber latex having a solid content, meaning dry rubber content, of 40.5 mass % and a ratio of SBR to VP of 95:5, an aqueous dispersion (having a solid content of 1.0 mass %) of oxidized nanocellulose (Celienpia, available from Nippon Paper Industries Co., Ltd.), a novolac resorcin-formaldehyde initial condensation product (RE resin under the trade name of Sumikanol 700S, available from Sumitomo Chemical Co., Ltd.), and a formaldehyde aqueous solution (37% solution, available from Kanto Chemical Co., Ltd.) were mixed and dispersed at the mass ratios presented in the upper section of Table 3 below, resulting in raw material dispersions in a slurry state having a solid content concentration of 60 mass % or less. Then, the raw material dispersions were subjected to coagulation using coagulants presented in the lower section of Table 3 below (with the sodium chloride being available from FUJIFILM Wako Pure Chemical Corporation while both of the acrylates being available from Asada Chemical Industry Co., Ltd.) at the amounts presented in the lower section of Table 3 below with respect to 100 parts by mass of the solid content of the rubber latex; then, the coagulation products were collected and dried, resulting in master batches (Examples 3 to 5 and Comparative Example 5 and 7). The drying was carried out by spreading the obtained coagulation products in pans and placing the pans in a constant temperature dryer at 70° C. for 24 hours. Note that in Comparative Example 5, washing was performed before drying. For washing, the operation of filtering the coagulation product under reduced pressure with a Buchner funnel while spraying distilled water on the surface of the coagulation product to wash away the sodium chloride was repeated 5 times. Further, in Comparative Example 6, coagulation did not occur, and a master batch was not obtained.

TABLE 2

|  | Comparative Example 1 | Comparative Example 2 | Example 1 | Example 2 | Comparative Example 3 | Comparative Example 4 |
|---|---|---|---|---|---|---|
| M100 (index %) | 100 | 90 | 120 | 110 | 200 | 120 |
| Eb (index %) | 100 | 110 | 110 | 120 | 80 | 50 |
| Stress at break (index %) | 100 | 90 | 120 | 110 | 80 | 50 |
| Water resistance | Poor | Good | Good | Good | Good | Good |

TABLE 3

|  | Comparative Example 5 | Comparative Example 6 | Example 3 | Example 4 | Comparative Example 7 | Example 5 |
|---|---|---|---|---|---|---|
| Rubber latex (SBR + VP solid content) | 100 | 100 | 100 | 100 | 100 | 100 |
| CNF | 5 | 5 | 5 | 5 | 5 | 5 |
| RF resin | 0.5 | 0.5 | 0.5 | 0.5 | 0.5 | 0.5 |
| Formaldehyde | 0.5 | 0.5 | 0.5 | 0.5 | 0.5 | 0.5 |
| Sodium chloride | 30 | — | — | — | — | — |
| Sodium acrylate | — | 0.1 | 0.5 | 1.5 | 2.5 | — |
| Calcium acrylate | — | — | — | — | — | 1.5 |

Each of the obtained master batches was made into a vulcanized rubber test piece by the method identical to that described in Test Example 1, and a tensile test was performed on the obtained vulcanized rubber test pieces in accordance With JIS K6251:2010 at a tensile speed of 500 mm/min to measure the tensile stress at 100% elongation (MI 100: MPa) and the elongation at break (meaning elongation at the time of hreaking:Eb) at room temperature (20° C.).

These results, along with the cohesiveness and necessity of washing after coagulation of each of the master batches, are presented in Table 4 below. Note that M100 and Eb are expressed as relative values (index values, index %) with Comparative Example 5 being assigned the value of 100.

These results show that the surface-treated nanocellulose master hatch according to an embodiment of the present invention, which contained an oxidized nanocellulose, a novolac resorcin-formaldehyde initial condensation product, and formaldehyde at the predetermined amounts and had been subjected to coagulation by the use of an unsaturated fatty acid metal salt (sodium acrylate or calcium acrylate) at the predetermined amount, was able to yield a rubber composition that had excellent cohesiveness, did not require washing after coagulation, and provided elongation and hardness in a compatible manner. Further, it can be inferred that the rubber composition had good water resistance and resistance against breakage as that in Test Example 1.

TABLE 4

|  | Comparative Example 5 | Comparative Example 6 | Example 3 | Example 4 | Comparative Example 7 | Example 5 |
|---|---|---|---|---|---|---|
| M100 (index %) | 100 | — | 120 | 130 | 150 | 140 |
| Eb (index %) | 100 | — | 110 | 100 | 30 | 120 |
| Cohesiveness | Good | Poor | Good | Good | Good | Good |
| Necessity of washing | YES | — | NO | NO | NO | NO |

The invention claimed is:

1. A surface-treated nanocellulose master batch comprising:

a rubber component;

a nanocellulose;

a resole or novolac resorcin-formaldehyde initial condensation product; and formaldehyde, the surface-treated nanocellulose master batch comprising from 0.3 to 15 parts by mass of the nanocellulose per 100 parts by mass of the rubber component, and the surface-treated nanocellulose master batch comprising from 0.03 to 1.2 parts by mass of the resole or novolac resorcin-formaldehyde initial condensation product per 1 part by mass of the nanocellulose and 0.02 to 0.8 parts by mass of the formaldehyde per I part by mass of the nanocellulose.

2. The surface-treated nanocellulose master batch according to claim 1, wherein the rubber component comprises a diene rubber and a styrene-butadiene-vinylpyridine terpolymer.

3. The surface-treated nanocellulose master batch according to claim 1, further comprising carbon black or silica.

4. The surface-treated nanocellulose master batch according to claim 1, further comprising from 0.1 to 15 parts by mass of an unsaturated fatty acid metal salt per 100 parts by mass of the rubber component.

5. The surface-treated nanocellulose master batch according to claim 4, wherein the unsaturated fatty acid metal salt is an acrylic acid metal salt and/oror a methacrylic acid metal salt.

6. The surface-treated nanocellulose master batch according to claim 2, further comprising carbon black or silica.

7. The surface-treated nanocellulose master batch according to claim 2, further comprising from 0.1 to 15 parts by mass of an unsaturated fatty acid metal salt per 100 parts by mass of the rubber component.

8. The surface-treated nanocellulose master batch according to claim 3, further comprising from 0.1 to 15 parts by mass of an unsaturated fatty acid metal salt per 100 parts by mass of the rubber component.

* * * * *